(12) United States Patent
Honda (10) Patent No.: US 6,328,486 B1
(45) Date of Patent: Dec. 11, 2001

(54) CAMERA

(75) Inventor: Takanori Honda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,004

(22) Filed: Dec. 21, 1998

(30) Foreign Application Priority Data

Dec. 26, 1997 (JP) .................................................. 9-359826

(51) Int. Cl.$^7$ .................................................. G03B 17/00
(52) U.S. Cl. .................................................. 396/415; 396/442
(58) Field of Search ............................... 396/6, 415, 440, 396/441, 442, 435, 436

(56) References Cited

U.S. PATENT DOCUMENTS

| | | | | |
|---|---|---|---|---|
| 4,384,774 | * | 5/1983 | Tuck | 396/435 |
| 5,187,512 | * | 2/1993 | Kirkendall | 396/6 |
| 5,521,668 | * | 5/1996 | Ezawa | 396/415 |

* cited by examiner

*Primary Examiner*—David M. Gray
(74) *Attorney, Agent, or Firm*—Robin, Blecker & Daley (57) ABSTRACT

A camera includes a camera body having formed integrally therewith a film-travel guide part in a film exposing position and a fixed photo-taking lens barrel, and a photo-taking image frame forming member mounted in the film exposing position on the camera body.

27 Claims, 7 Drawing Sheets

CAMERA

BACKGROUND OF THE INVENTION

1. Field of the Invention

The present invention relates to a camera and, more particularly, to the structural arrangement of a body of the camera.

2. Description of Related Art

Figure 6:
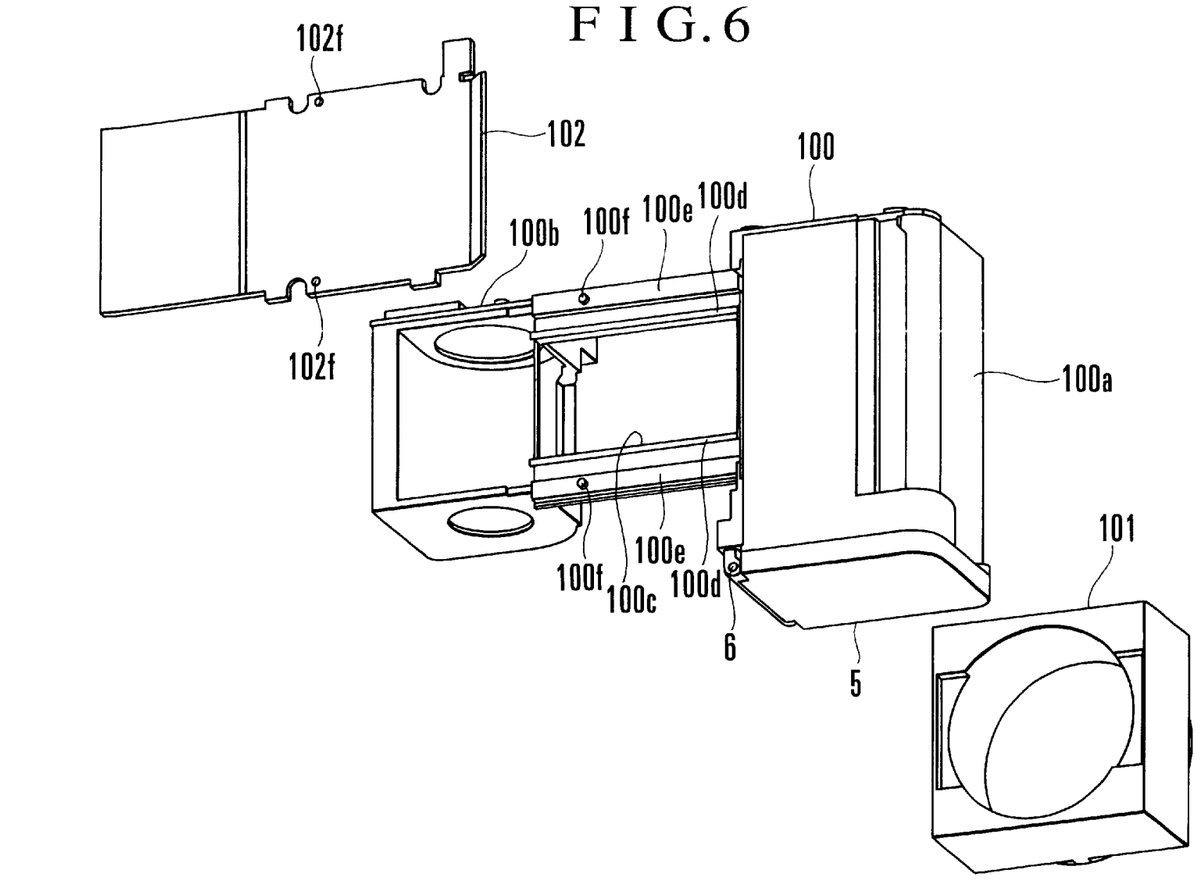
FIG. 6 is an exploded perspective view showing the structural arrangement of a conventional camera.

The structural arrangement of a body of a conventional camera has been made as shown in FIG. 6 in general. Referring to FIG. 6, which is an exploded perspective view, the camera body 100 is integrally composed of a cartridge chamber 100a into which a container containing a film therein (such as a film cassette or a film cartridge) is loaded, a spool chamber 100b in which a film take-up spool arranged to take up and wind an exposed part of the film thereon is disposed, an aperture part 100c which is provided for exposing the film to light between the cartridge chamber 100a and the spool chamber 100b, and inner rails 100d and outer rails 100e which are provided outside the aperture part 100c as a travel path of the film for guiding the travel of the film. Dowels 100f mounted on the camera body 100 are arranged to be fitted in respective mounting datum holes 102f provided in a pressure plate 102 ao as to fix the pressure plate 102 in position.

With the camera body 100 arranged in the above manner, a photo-taking lens barrel 101 is secured to a part of the camera body 100 between the cartridge chamber 100a and the spool chamber 100b, and the pressure plate 102 is disposed on one side of the camera body 100 opposite to the photo-taking lens barrel 101 so as to keep the flatness of the film.

Figure 7:
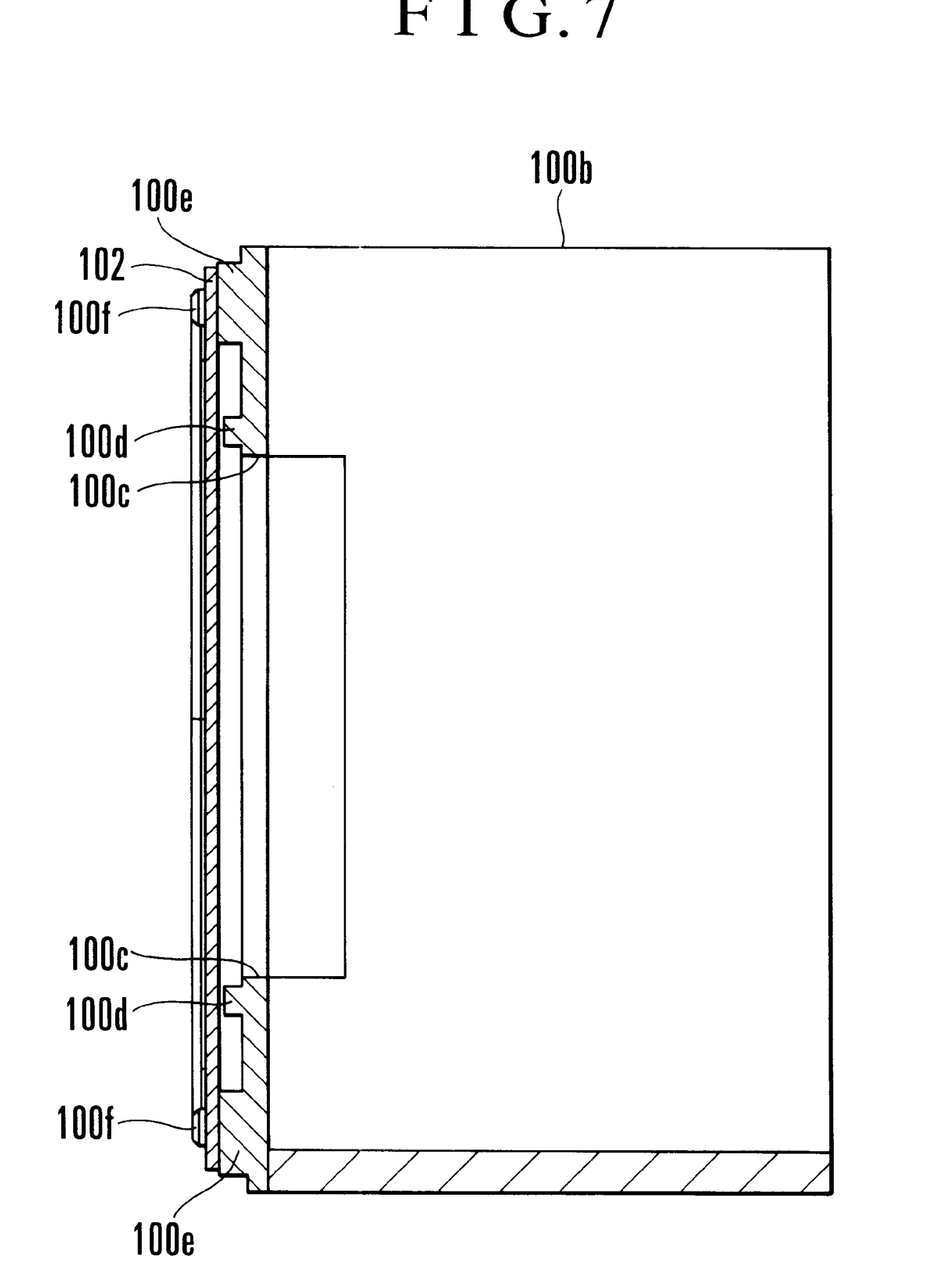
FIG. 7 is a sectional view taken across the middle part of the camera shown in FIG. 6.

FIG. 7 is a sectional view taken across a middle part of the camera shown in FIG. 6. Referring to FIG. 7, it is apparent that portions of the camera body 100 corresponding to the upper and lower inner rails 100d and the upper and lower outer rails 100e are set sufficiently thick in view of the rigidity of the camera body 100.

Meanwhile, in Japanese Laid-Open Patent Application No. HEI 6-95226, there is disclosed such a structural arrangement of the camera body that a fixed photo-taking lens barrel is formed integrally with the camera body for the purpose of reducing the size of the whole camera, and a member having an aperture part and a film-travel rail part, which is formed separately from the camera body, is fixed to the camera body from behind the camera body. In this structural arrangement, the aperture part and the film-travel rail part are relieved from the above-stated requirement for giving a sufficient rigidity to the camera body and thus can be formed thin for reduction in size of the camera.

However, in the structural arrangement of the camera body generally employed in the conventional camera described above, the aperture part inclusive of the film-travel rail part is used not only for interconnecting the cartridge chamber and the spool chamber but also for giving a sufficient rigidity or strength to the camera body. To meet this requirement, the thickness of the aperture part must be sufficiently thick. Therefore, it has been impossible to reduce the thickness of the camera body in the direction of a photo-taking optical axis.

Further, in recent years, a high-magnification zoom lens having two or more times variations of focal length is popularly used in the compact camera. Therefore, in order to enable the camera body to support such a heavy zoom lens, the above-stated requirement for thickening the aperture part has increased.

On the other hand, in the case of the camera disclosed in the above-mentioned Japanese Laid-Open Patent Application No. HEI 6-95226, the fixed photo-taking lens barrel, which is formed integrally with the camera body, serves to strongly connect the spool chamber and the cartridge chamber to each other. The member having the aperture part and the film-travel rail part is not required to serve as such a connecting part. Therefore, this member can be formed thin. However, since the structural arrangement of the camera body is necessarily made complicated, it is still impossible to make the camera body sufficiently thin in the direction of a photo-taking optical axis.

BRIEF SUMMARY OF THE INVENTION

In accordance with one aspect of the invention, there is provided a camera, which comprises a camera body having formed integrally therewith a film-travel guide part in a film exposing position and a fixed photo-taking lens barrel, and a photo-taking image frame forming member mounted in the film exposing position on the camera body, so that the camera has a compact structural arrangement capable of accurately forming a photo-taking image frame and accurately guiding the travel of film.

In accordance with another aspect of the invention, there is provided a camera, which comprises a camera body having formed integrally therewith a fixed photo-taking lens barrel, a photo-taking image frame forming member mounted in a film exposing position on the camera body, and fixing means for fixing the photo-taking image frame forming member to the camera body and for guiding travel of film in the film exposing position on the camera body, so that the camera has a compact structural arrangement capable of accurately positioning the photo-taking image frame forming member and accurately guiding the travel of film.

These and other aspects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

(First Embodiment)

Figure 1:
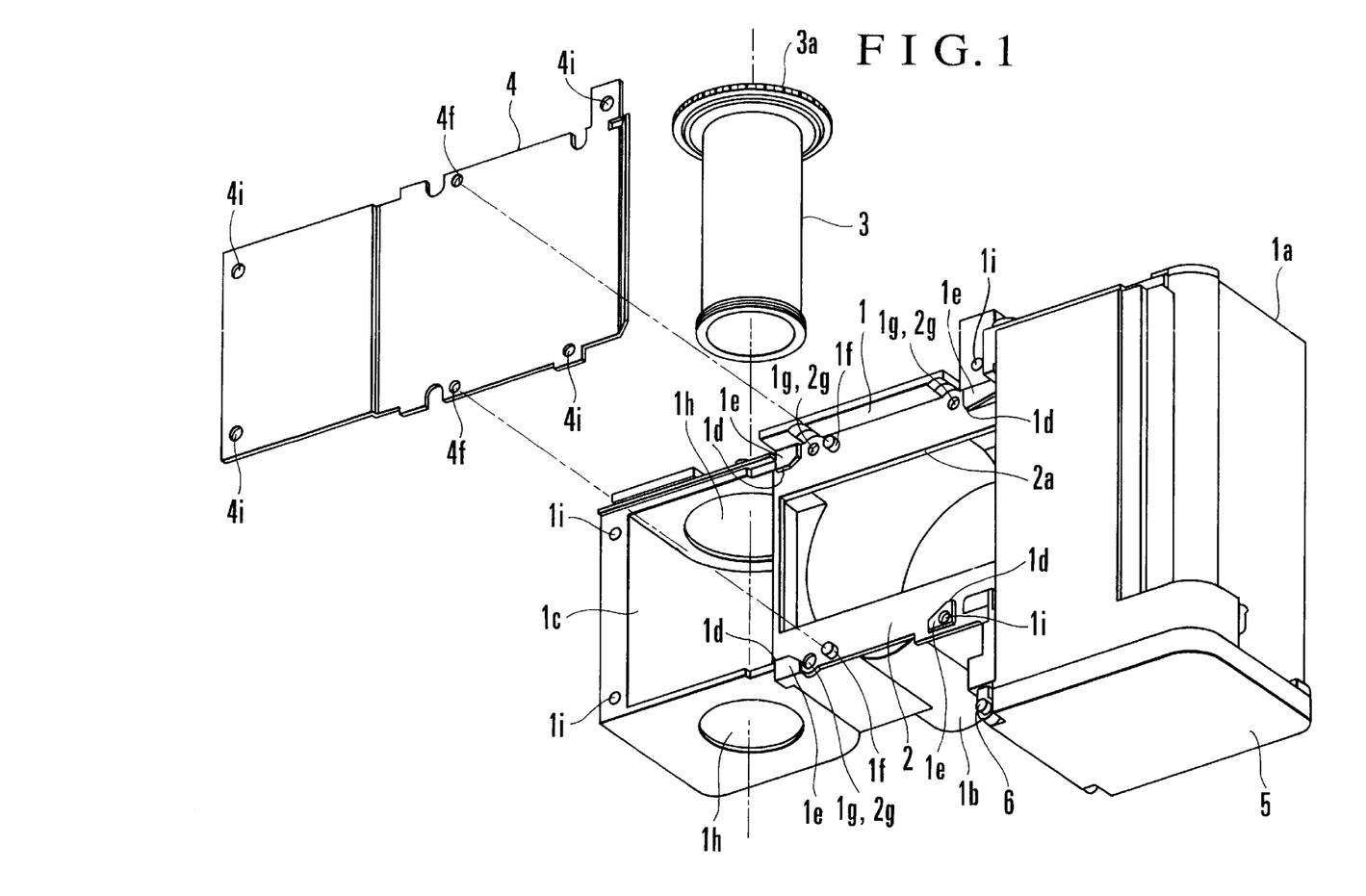
FIG. 1 is an exploded perspective view of a camera body according to a first embodiment of the invention as viewed from behind the camera body.

FIG. 1 is an exploded perspective view showing a camera body according to a first embodiment of the invention as viewed from behind the camera body. Referring to FIG. 1, reference numeral 1 denotes the camera body. The camera body 1 includes a cartridge chamber 1a into which a film cartridge (not shown) is loaded, a fixed photo-taking lens barrel 1b having an inner helicoid in which a movable lens barrel having a photo-taking optical system is contained, a spool chamber 1c in which a film take-up spool arranged to take up thereon an exposed part of film wound by a known film transport device is contained, film-travel guide parts 1d provided at four corners of the fixed photo-taking lens barrel 1b in a film exposing position where a photo-taking light flux is never eclipsed, datum faces 1e which define a datum plane for mounting a pressure plate 4 and which constitute a film travel path, i.e., a tunnel amount, in conjunction with an aperture member 2 and the pressure plate 4, dowels if provided for positioning the pressure plate 4 and the aperture member 2, screw holes 1g provided for fixing the aperture member 2, spool holes 1h in which the film take-up spool 3 is fitted, and screw holes 1i provided for fixing the pressure plate 4. The above parts 1a to 1i are formed integrally with the camera body 1 by molding with some suitable synthetic resin material such as a plastic material.

The aperture member 2 has a photo-taking image frame 2a formed therein and is made of a thin sheet metal having cutouts formed at four corners thereof for the film-travel guide parts 1d. In the aperture member 2, there are formed positioning holes 2f provided for positioning the aperture member 2 by fitting therein the positioning dowels 1f provided on the fixed photo-taking lens barrel 1b of the camera body 1, and screw holes 2g provided for fixing the aperture member 2.

The film take-up spool 3 has a spool gear part 3a which is in mesh with a gear of the known film transport device (not shown). The pressure plate 4 is arranged to be mounted on the camera body 1 in a state of abutting on the pressure-plate mounting datum faces 1e. In the pressure plate 4, there are formed positioning holes 4f provided for positioning the pressure plate 4 by fitting therein the positioning dowels 1f, and screw holes 4i provided for fixing the pressure plate 4 to the camera body 1. A cartridge chamber lid 5 is arranged to pivotally rotate around a hinge shaft 6 provided on the camera body 1.

Figure 2:
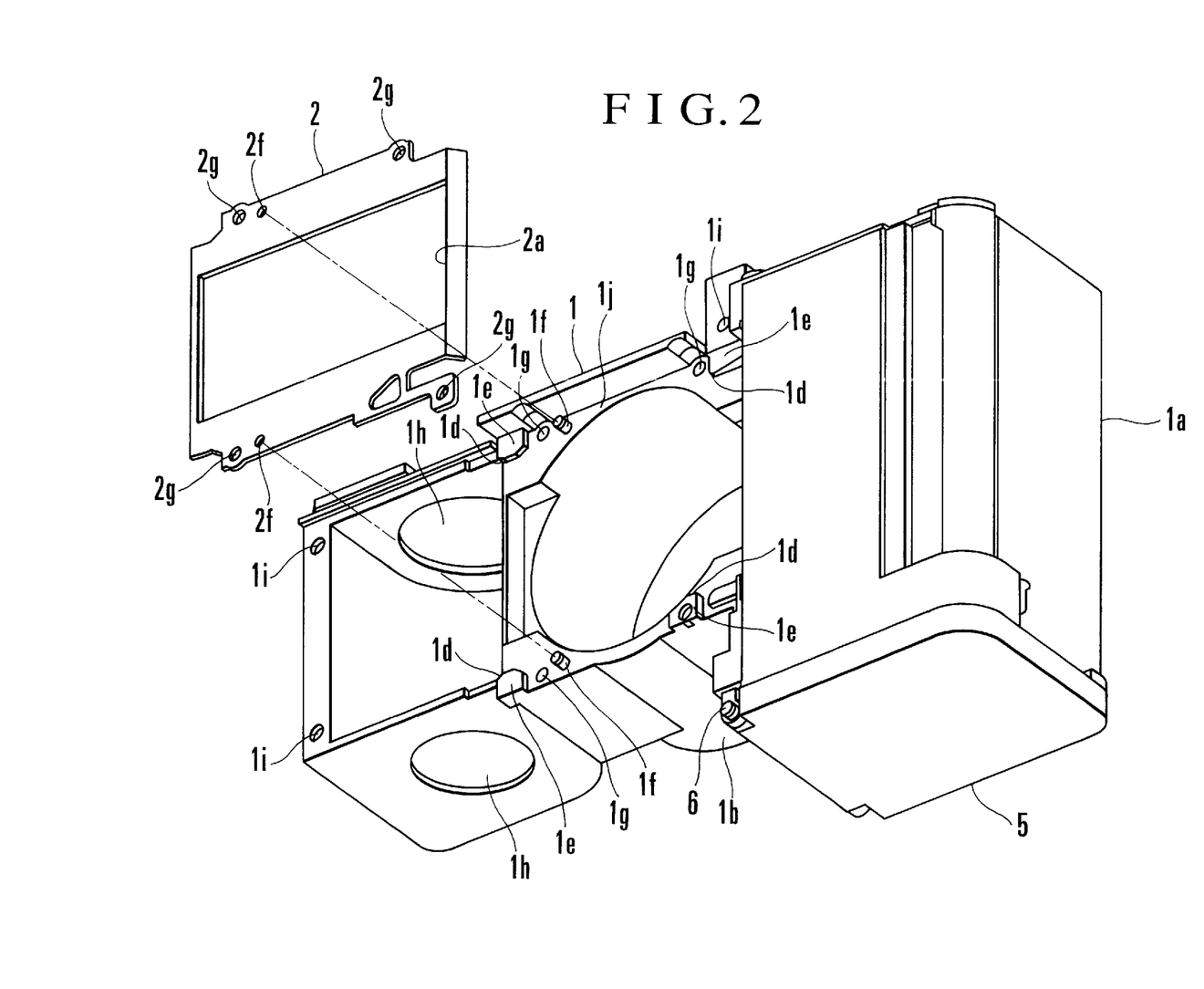
FIG. 2 is an exploded perspective view of the camera body shown in FIG. 1 in a state of having an aperture member removed from the camera body.

FIG. 2 is an exploded perspective view showing the camera shown in FIG. 1 in a state of having the aperture member 2 removed from the camera body 1. In FIG. 2, reference numeral 1j denotes a mounting datum face of the fixed photo-taking lens barrel 1b of the camera body 1 to be used in mounting the aperture member 2.

Figure 3:
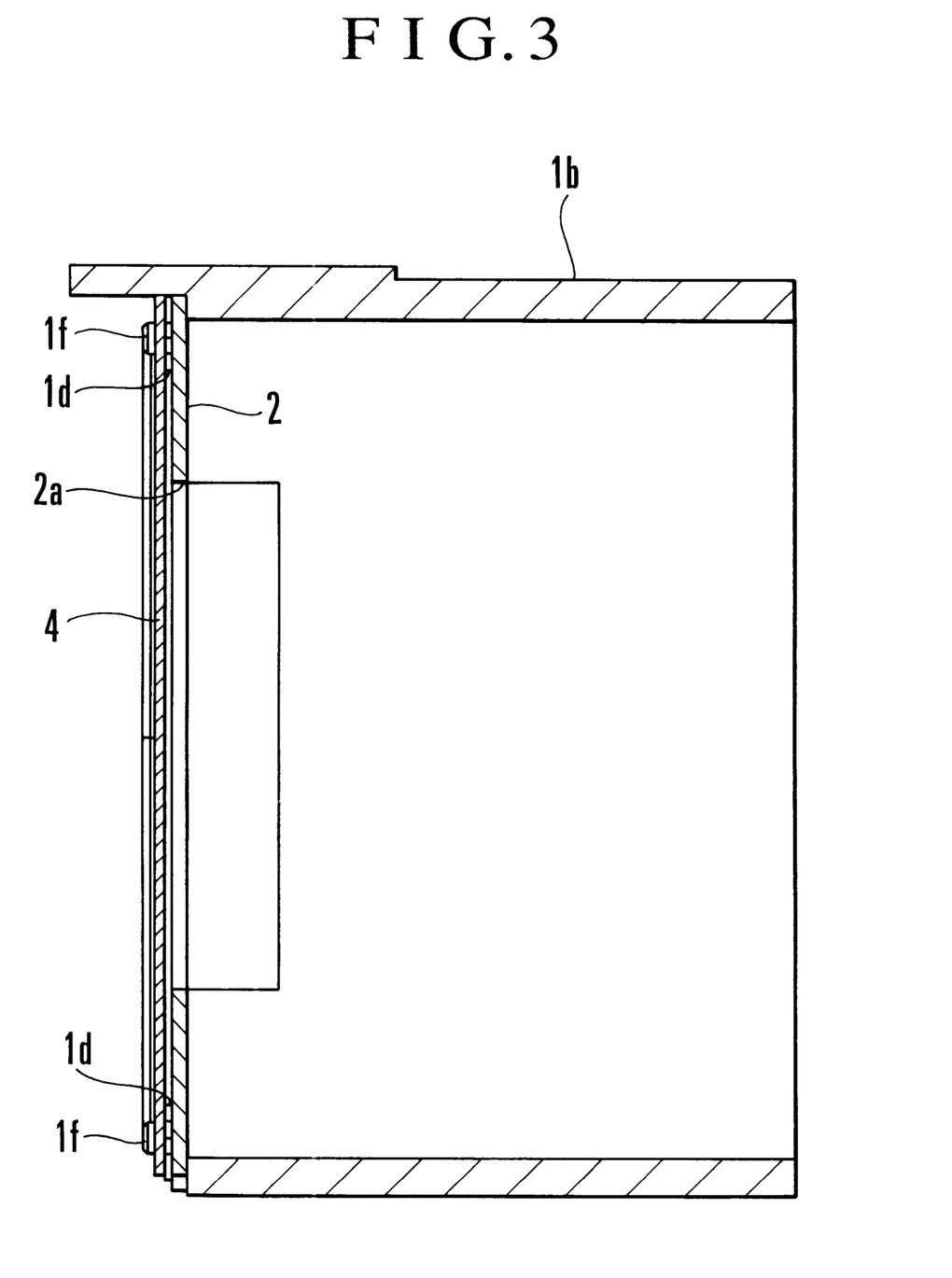
FIG. 3 is a sectional view taken across the middle part of the camera body shown in FIG. 1.

FIG. 3 is a vertical sectional view taken across the middle part of the camera body 1 shown in FIG. 1. As is apparent from FIG. 3, the aperture member 2 is fixed to the fixed photo-taking lens barrel 1b. A tunnel amount which is sufficient for passing the film is obtained between the aperture member 2 and the pressure plate 4 with the pressure plate 4 fixed in position by having the pressure plate 4 abut on the pressure-plate mounting datum faces 1e of the fixed photo-taking lens barrel 1b. Further, the behavior in the vertical direction of the film is restricted by the film-travel guide parts 1d provided at the four corners of the fixed photo-taking lens barrel 1b outside the photo-taking optical path.

(Second Embodiment)

Figure 4:
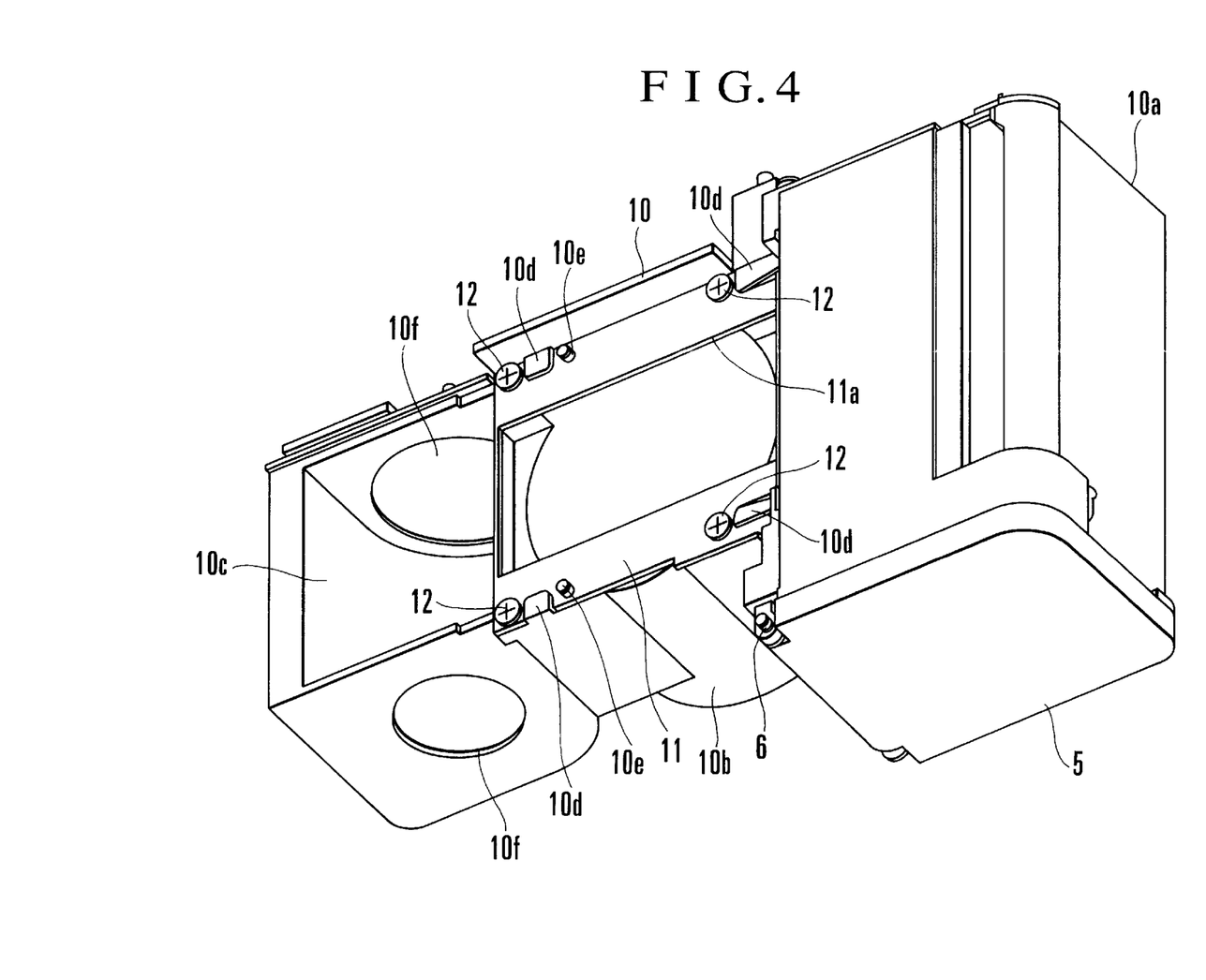
FIG. 4 is a perspective view of a camera body according to a second embodiment of the invention as viewed from behind the camera body.

FIG. 4 is a perspective view showing a camera body according to a second embodiment of the invention as viewed from behind the camera body. Referring to FIG. 4, reference numeral 10 denotes the camera body. The camera body 10 includes a cartridge chamber 10a into which a film cartridge (not shown) is loaded, a fixed photo-taking lens barrel 10b having an inner helicoid in which a lens barrel (not shown) having a photo-taking optical system is disposed, a spool chamber 10c in which an exposed part of film wound by a known film transport device is placed, datum faces 10d which define a datum plane for mounting a pressure plate (not shown) and which define a film travel path, i.e., a tunnel amount, in conjunction with an aperture member 11 and the pressure plate (not shown), dowels 10e provided for positioning the pressure plate (not shown) and the aperture member 11, and spool holes 10f in which a film take-up spool (not shown) is fitted. The above parts 10a to 10f are formed integrally with the camera body 10 by molding with some suitable synthetic resin material such as a plastic material.

The aperture member 11 is made of a thin sheet metal and has a photo-taking image frame 11a formed therein.

Fixing screws 12 are arranged to fix the aperture member 11 to the rear side of the fixed photo-taking lens barrel 11b of the camera body 10. In addition, the fixing screws 12 are arranged to guide, by their head parts, the travel of the film in a film exposing position and are disposed at four corners outside the photo-taking image frame 11a where no photo-taking light flux is eclipsed by them.

(Third Embodiment)

Figure 5:
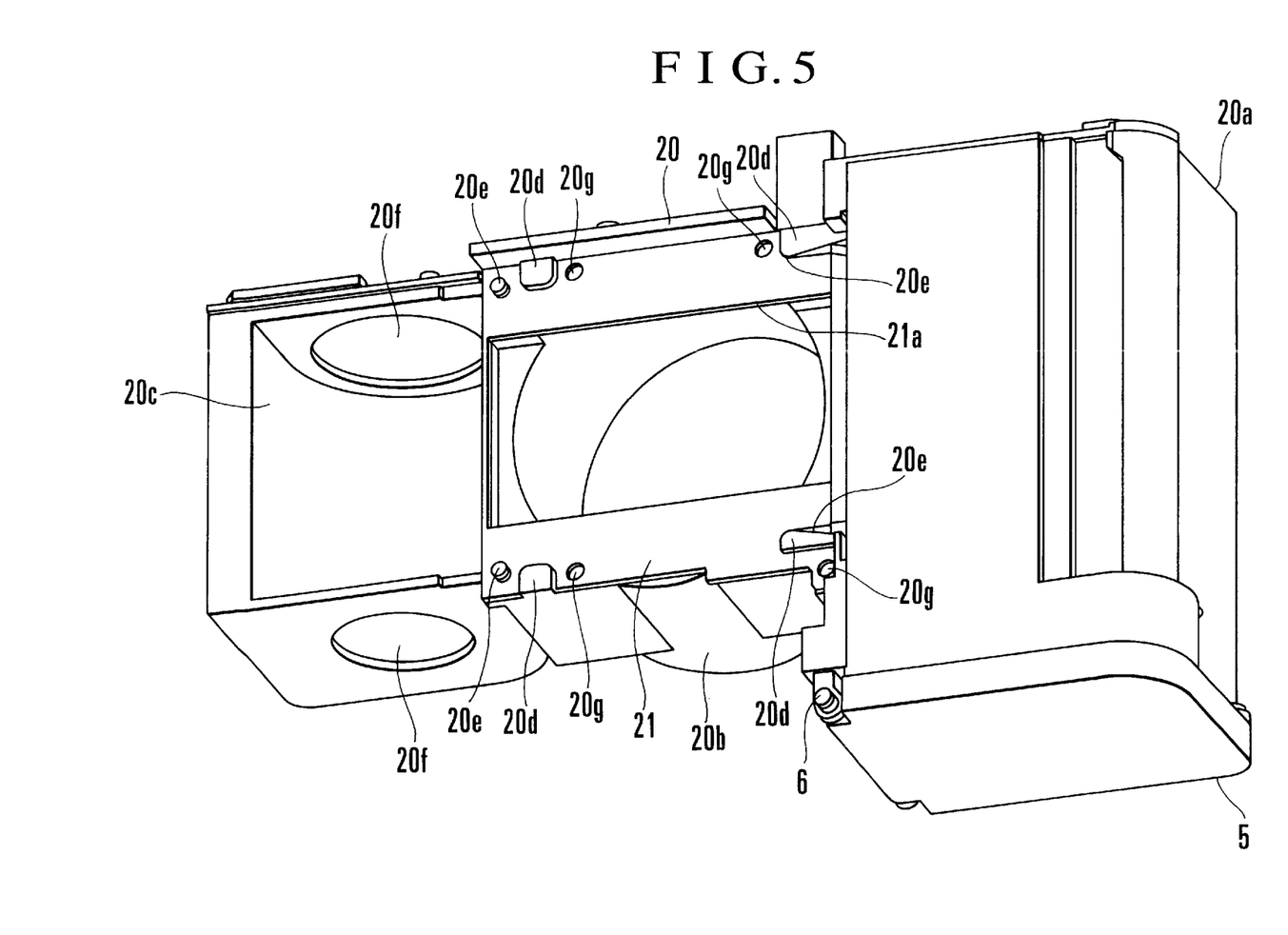
FIG. 5 is a perspective view of a camera body according to a third embodiment of the invention as viewed from behind the camera body.

FIG. 5 is a perspective view showing a camera body according to a third embodiment of the invention as viewed from behind the camera body. Referring to FIG. 5, reference numeral 20 denotes the camera body. The camera body 20 includes a cartridge chamber 20a into which a film cartridge (not shown) is loaded, a fixed photo-taking lens barrel 20b having an inner helicoid in which a lens barrel (not shown) having a photo-taking optical system is disposed, a spool chamber 20c in which an exposed part of film wound by a known film transport device is placed, datum faces 20d which define a datum plane for mounting a pressure plate (not shown) and which define a film travel path, i.e., a tunnel amount, in conjunction with an aperture member 21 and the pressure plate (not shown), film-travel guide parts 20e provided for guiding the travel of film in a film exposing position and for positioning the pressure plate (not shown) and the aperture member 21, spool holes 20f in which a film take-up spool (not shown) is fitted, and screw holes 20g provided for mounting the aperture member 21. The above parts 20a to 10g are formed integrally with the camera body 20 by molding with some suitable synthetic resin material such as a plastic material.

The aperture member 21 is made of a thin sheet metal and has a photo-taking image frame 21a formed therein.

While the invention has been described with respect to what is considered to be the preferred embodiments thereof, it is to be understood that the invention is not limited to the embodiments disclosed. The invention applies to any arrangement whereby the functions of the embodiments disclosed and defined by the following claims can be accomplished.

For example, a pressure plate mentioned in the following claims may be construed to be not limited to a conventional elastic member of a plate shape but to include everything that permits accurate film positioning in the direction of an optical axis in the film exposing position, i.e., at a focal position.

The invention may be carried out by combining as necessary the embodiments or their technological elements described in the foregoing.

The invention applies to cases where either the whole or a part of claims or the arrangement of each embodiment described forms one apparatus or is used in combination with some other apparatus or as a component element of an apparatus.

The invention is applicable to cameras of varied kinds, such as a single-lens reflex camera, a lens-shutter type camera, a video camera, etc., optical apparatuses other than cameras, devices adapted for cameras, optical apparatuses and other apparatuses, and component elements forming these apparatuses and devices.

As described in the foregoing, according to the arrangement of each of the embodiments disclosed, the size or thickness of a camera in the direction of the photo-taking optical axis can be reduced as desired.

What is claimed is:

1. A camera comprising:
    a camera body having formed integrally therewith film-travel guide parts, mutually spaced in a film travel direction aside a film exposing position, and a fixed photo-taking lens barrel;
    a photo-taking image frame forming member mounted in the film exposing position on said camera body; and
    a pressure plate mounted on said camera body;
    wherein:
        said camera body further has integrally formed therewith a plurality of protrusions on which said pressure plate abuts, said protrusions defining a datum plane for mounting said pressure plate; and
        said protrusions constitute a film travel path in conjunction with said photo-taking image frame forming member and said pressure plate.

2. A camera according to claim 1, wherein said film-travel guide part and said fixed photo-taking lens barrel are formed integrally with said camera body by molding with a plastic material.

3. A camera according to claim 1, wherein said photo-taking image frame forming member is formed with a thin sheet metal.

4. A camera according to claim 1, wherein said film-travel guide parts and said protrusions are formed integrally with each other.

5. A camera according to claim 1, wherein said film-travel guide part further serves as a positioning part for positioning said photo-taking image frame forming member.

6. A camera according to claim 1, wherein said camera body includes a cartridge chamber formed integrally therewith.

7. A camera according to claim 1, wherein said camera body includes a spool chamber formed integrally therewith.

8. A camera according to claim 1, wherein said camera body includes a datum face for mounting thereon said photo-taking image frame forming member.

9. A camera according to claim 8, wherein said film-travel guide part includes a part having such a shape as to protrude from said datum face.

10. A camera according to claim 1, wherein said film-travel guide part has such a height as to protrude from a plane defined by said photo-taking image frame forming member in a state where said photo-taking image frame forming member is mounted on said camera body.

11. A camera according to claim 1, wherein said film-travel guide part includes means for guiding film in a direction perpendicular to said travel direction of the film.

12. A camera according to claim 1, wherein said film-travel guide part includes means for guiding film in a direction along a surface of the film.

13. A camera according to claim 1, wherein said film-travel guide part includes means for guiding film in a direction perpendicular to said travel direction of the film and along a surface of the film.

14. A camera according to claim 1, wherein said photo-taking image frame forming member has a cutout part formed at a position corresponding to said film-travel guide part.

15. A camera comprising:
    a camera body having formed integrally therewith a fixed photo-taking lens barrel;
    a photo-taking image frame forming member mounted in a film exposing position on said camera body; and
    fixing means formed integrally with said camera body and mutually spaced in a film travel direction for fixing said photo-taking image frame forming member to said camera body and for guiding travel of film in the film exposing position on said camera body;
        wherein said fixing means protrudes from said photo-taking image frame forming member mounted on said camera body.

16. A camera according to claim 15, wherein said fixed photo-taking lens barrel is formed integrally with said camera body by molding with a plastic material.

17. A camera according to claim 15, wherein said photo-taking image frame forming member is formed with a thin sheet metal.

18. A camera according to claim 15, wherein said camera body includes a cartridge chamber formed integrally therewith.

19. A camera according to claim 15, wherein said camera body includes a spool chamber formed integrally therewith.

20. A camera according to claim 15, wherein said camera body includes a datum face for mounting thereon said photo-taking image frame forming member.

21. A camera according to claim 15, wherein said fixing means includes a part having such a shape as to protrude from said datum face.

22. A camera according to claim 15, wherein said fixing means has such a height as to protrude from a plane defined by said photo-taking image frame forming member in a state where said photo-taking image frame forming member is mounted on said camera body.

23. A camera according to claim 15, wherein said fixing means includes means for guiding the film in a direction perpendicular to said travel direction of the film.

24. A camera according to claim 15, wherein said fixing means includes means for guiding the film in a direction along a surface of the film.

25. A camera according to claim 15, wherein said fixing means includes means for guiding the film in a direction perpendicular to said travel direction of the film and along a surface of the film.

26. A camera according to claim 25, wherein said fixing means includes means for positioning said photo-taking image frame forming member in the direction along the surface of the film.

27. A camera according to claim 15, wherein said photo-taking image frame forming member has a cutout part formed at a position corresponding to said fixing means.

* * * * *

UNITED STATES PATENT AND TRADEMARK OFFICE
CERTIFICATE OF CORRECTION

PATENT NO.    : 6,328,486 B1
DATED         : December 11, 2001
INVENTOR(S)   : Takanori Honda It is certified that error appears in the above-identified patent and that said Letters Patent is hereby corrected as shown below:

<u>Column 4,</u>
Line 21, delete "11b" and insert -- 10b --.

Signed and Sealed this

Twenty-ninth Day of October, 2002

*Attest:*

*Attesting Officer*

JAMES E. ROGAN
*Director of the United States Patent and Trademark Office*